United States Patent
Wiedemann

(10) Patent No.: US 11,274,204 B2
(45) Date of Patent: Mar. 15, 2022

(54) IMPACT-MODIFIED POLYAMIDE MOULDING COMPOUNDS

(71) Applicant: EMS-PATENT AG, Domat/Ems (CH)

(72) Inventor: Thomas Wiedemann, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 134 days.

(21) Appl. No.: 16/595,559

(22) Filed: Oct. 8, 2019

(65) Prior Publication Data
US 2020/0109284 A1    Apr. 9, 2020

(30) Foreign Application Priority Data
Oct. 9, 2018    (EP) .................................. 18 199 329

(51) Int. Cl.
*C08L 77/06*    (2006.01)

(52) U.S. Cl.
CPC ........... *C08L 77/06* (2013.01); *C08L 2205/03* (2013.01)

(58) Field of Classification Search
CPC ..... C08G 69/265; C08L 77/06; C08L 53/005; C08L 53/02; C08L 53/025
See application file for complete search history.

(56) References Cited

U.S. PATENT DOCUMENTS

| | | |
|---|---|---|
| 6,482,889 B1 | 11/2002 | Kurz |
| 7,723,411 B2 | 5/2010 | Schneider |
| 7,973,191 B2 | 7/2011 | Döring et al. |
| 8,022,170 B2 | 9/2011 | Hoffman et al. |
| 8,268,956 B2 | 9/2012 | Bühler et al. |
| 8,383,244 B2 | 2/2013 | Bayer et al. |
| 8,404,323 B2 | 3/2013 | Pfleghar et al. |
| 8,586,662 B2 | 11/2013 | Harder et al. |
| 8,604,120 B2 | 12/2013 | Stoppelmann et al. |
| 8,993,662 B2 | 3/2015 | Kaplan |
| 9,109,115 B2 | 8/2015 | Bühler |
| 9,133,322 B2 | 9/2015 | Roth et al. |
| 9,359,532 B2 | 6/2016 | Kaplan |
| 9,453,106 B2 | 9/2016 | Bühler |
| 9,644,081 B2 | 5/2017 | Aepli et al. |
| 9,663,655 B2 | 5/2017 | Aepli et al. |
| 9,815,967 B2 | 11/2017 | Harder et al. |
| 9,963,547 B2 | 5/2018 | Hoppe et al. |
| 9,963,591 B2 | 5/2018 | Bayer et al. |
| 9,969,882 B2 | 5/2018 | Thomas et al. |
| 10,144,805 B2 | 12/2018 | Bayer et al. |
| 10,233,326 B2 | 3/2019 | Koch et al. |
| 2006/0235190 A1 | 10/2006 | Hoffman et al. |
| 2006/0264542 A1 | 11/2006 | Schneider |
| 2008/0135720 A1 | 6/2008 | Bühler et al. |
| 2008/0300347 A1 | 12/2008 | Kurz et al. |
| 2010/0069657 A1 | 3/2010 | Döring et al. |
| 2010/0168423 A1 | 7/2010 | Döring et al. |
| 2010/0279111 A1 | 11/2010 | Harder et al. |
| 2011/0220667 A1 | 9/2011 | Pfleghar et al. |
| 2012/0029133 A1 | 2/2012 | Stöppelmann et al. |
| 2012/0115993 A1 | 5/2012 | Kaplan |
| 2012/0237708 A1 | 9/2012 | Caviezel et al. |
| 2012/0321829 A1 | 12/2012 | Bayer et al. |
| 2013/0317168 A1 | 11/2013 | Bühler |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0272227 A1 | 9/2014 | Jeltsch et al. |
| 2014/0275392 A1 | 9/2014 | Bühler |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0369098 A1 | 12/2016 | Yasuda et al. |
| 2016/0376423 A1 | 12/2016 | Harder et al. |
| 2017/0058123 A1 | 3/2017 | Sötterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171074 A1 | 6/2018 | Wiedemann et al. |
| 2018/0171141 A1 | 6/2018 | Thomas et al. |

(Continued)

FOREIGN PATENT DOCUMENTS

| | | |
|---|---|---|
| EP | 2 778 190 B1 | 7/2015 |
| EP | 3 336 131 A1 | 6/2018 |

*Primary Examiner* — Ana L. Woodward
(74) *Attorney, Agent, or Firm* — Leydig, Voit & Mayer, Ltd.

(57) ABSTRACT

The present invention relates to impact-modified polyamide moulding compounds which, in addition to a specific, amorphous polyamide and a functionalised styrene-butadiene-styrene triblock copolymer as impact modifier, possibly comprise further specific, partially crystalline polyamides and additives. Likewise, the invention relates to the use of these polyamide moulding compounds for the production of moulded articles.

15 Claims, No Drawings

(56) References Cited

U.S. PATENT DOCUMENTS

| | | |
|---|---|---|
| 2018/0251599 A1 | 9/2018 | Hoffmann et al. |
| 2018/0251600 A1 | 9/2018 | Aepli et al. |
| 2018/0298191 A1 | 10/2018 | Schubert et al. |
| 2019/0055356 A1 | 2/2019 | Aepli et al. |
| 2019/0055404 A1 | 2/2019 | Aepli et al. |
| 2019/0055405 A1 | 2/2019 | Aepli et al. |
| 2019/0062554 A1 | 2/2019 | Wiedemann et al. |
| 2019/0136053 A1 | 5/2019 | Fujii et al. |

IMPACT-MODIFIED POLYAMIDE MOULDING COMPOUNDS

CROSS-REFERENCE TO A RELATED APPLICATION

This patent application claims the benefit of European Patent Application No. 18 199 329.6, filed on Oct. 9, 2018, the disclosure of which is incorporated herein by reference in its entirety for all purposes.

The present invention relates to impact-modified polyamide moulding compounds which, in addition to a specific, amorphous polyamide and a functionalised styrene-butadiene-styrene triblock copolymer as impact modifier, possibly comprise further specific, partially crystalline polyamides and additives. Likewise, the invention relates to the use of these polyamide moulding compounds for the production of moulded articles.

Polyamides are widespread nowadays as structural elements for inside and outside areas, in particular in the sphere of housings, optical devices and displays but also in the sphere of household appliances and sports articles. This can be attributed essentially to the good mechanical properties of the polyamides. This is important for the good processability of the moulding compounds in order to enable the most varied of shaping. At the same time, it is however also important to enable good optical properties of the moulding compounds, in particular with respect to transparency which should also be maintained after fairly long use.

From EP 3 336 131 A1, a polyamide moulding compound based on an amorphous polyamide with good processability with likewise good optical properties is known. The amorphous polyamide can thereby also be modified with aliphatic polyamides.

From EP 2 778 190 B1, transparent blends of polyamides of the group PA MACM12, PA PACM12, PA MACM10, PA PACM10, PA MACM14 and PA PACM14, the mixtures and copolyamides thereof with a functionalised styrene-ethylene/butylene-styrene block copolymer (SEBS) as impact modifier are known, which have a high notch impact strength.

Starting therefrom, the object was to provide a polyamide moulding compound which, in addition to high rigidity, in particular expressed by the modulus of elasticity in tension, has high strength, in particular expressed by the notch impact strength and very good optical properties, in particular expressed by the haze and the light transmission.

This object is achieved by the features of the polyamide moulding compound described herein, and the advantageous developments thereof.

According to the invention, a polyamide moulding compound is provided, comprising or consisting of the following components (A) to (D):
(A) 55 to 97% by weight of at least one amorphous copolyamide formed from the monomers (a1) to (a4):
  (a1) 25 to 40% by mol of at least one acyclic, aliphatic diamine with 6 to 10 carbon atoms;
  (a2) 10 to 25% by mol of at least one cycloaliphatic diamine with 6 to 36 carbon atoms;
  (a3) 20 to 40% by mol of at least one aromatic dicarboxylic acid;
  (a4) 10 to 30% by mol of at least one acyclic, aliphatic dicarboxylic acid with 8 to 16 carbon atoms;
  the components of the monomers (a1) and (a2) relating to the sum of the diamines used and adding up to 50% by mol, and the proportions of monomers (a3) and (a4) relating to the sum of the dicarboxylic acids used and adding up to 50% by mol;
(B) 3 to 22% by weight of at least one functionalised styrene-butadiene-styrene triblock copolymer;
(C) 0 to 15% by weight of at least one aliphatic, partially crystalline polyamide, selected from the group consisting of PA 6/12 and PA 612; and
(D) 0 to 8% by weight of at least one additive;
the quantity proportions of components (A) to (D) adding up to 100% by weight.

Definitions of the Terms

Spellings and Abbreviations for Polyamides and the Monomers Thereof

In the sense of the present invention, there is understood by the term "polyamide" (abbreviation PA), a generic term, the latter including homopolyamides and copolyamides. The selected spellings and abbreviations for polyamides and the monomers thereof correspond to those specified in the ISO standard 16396-1 (2015, (D)). The abbreviations used therein are used synonymously in the following to the IUPAC names of the monomers.

In General with Respect to the Quantity Data

The polyamide moulding compounds according to the present invention comprise or consist of components (A) and (B) and also possibly (C) and/or (D), the proviso thereby applies that components (A), (B), (C) and (D) add up in total to 100% by weight. The specified ranges of the quantity data for the individual components (A), (B), (C) and (D) should be understood such that, within the prescribed ranges, an arbitrary quantity can be selected for each of the individual components, provided the proviso is fulfilled that the sum of all components (A) to (D) produce 100% by weight.

Functionalisation of Component (B)

Component (B) can be functionalised by copolymerisation or by grafting. In the sense of the present invention, functionalisation by copolymerisation means the incorporation of the functionalising compound in the main chain of component (B) as component of this main chain. There is understood, in contrast, by functionalisation of component (B) by grafting, binding of the functionalising compound to the main chain so that side chains are formed.

Partially Crystalline Polyamides

In the sense of the present invention, partially crystalline polyamides are those polyamides which have a melting point.

In the sense of the present invention, partially crystalline polyamides are those polyamides which, in dynamic differential calorimetry (Differential Scanning calorimetry, DSC) according to ISO 11357-3 (2013) at a heating rate of 20 K/min, preferably have a melting heat of more than 4 J/g.

Polyamide Moulding Compound

The polyamide moulding compound according to the invention comprises components (A) and (B) and possibly component (C) and/or component (D) or consists of these.

According to a preferred embodiment of the present invention, the proportion of component (A) in the polyamide moulding compound is in the range of 61 to 97% by weight, preferably of 67 to 93% by weight and particularly preferably of 77% to 90.9% by weight, relative to the total weight of the polyamide moulding compound.

According to a further preferred embodiment of the present invention, the proportion of component (B) in the polyamide moulding compound is in the range of 3 to 20% by weight, preferably of 4 to 17% by weight and particularly preferably of 4 to 10% by weight, relative to the total weight of the polyamide moulding compound.

A further preferred embodiment provides that the proportion of component (C) in the polyamide moulding compound is in the range of 0 to 13% by weight, preferably of 3 to 12% by weight and particularly preferably of 5 to 10% by weight, relative to the total weight of the polyamide moulding compound.

A further preferred embodiment provides that the proportion of component (D) in the polyamide moulding compound is in the range of 0 to 6% by weight, preferably of 0 to 4% by weight and particularly preferably of 0.1 to 3% by weight, relative to the total weight of the polyamide moulding compound.

The haze of the polyamide moulding measured on a moulded article (2 mm thick plates with width and length: 60×60 mm) produced from the polyamide moulding compound, according to ASTM D1003, is at most 20%, preferably at most 15% and particularly preferably at most 10%.

The light transmission measured on a moulded article (2 mm thick plates with width and length: 60×60 mm) produced from the polyamide moulding compound, according to ASTM D1003, is at least 80%, preferably at least 85% and particularly preferably at least 90%.

A moulded article produced from the polyamide moulding compound preferably has a modulus of elasticity in tension, determined according to ISO 527 of at least 1,500 MPa, preferably at least 1,700 MPa, particularly preferably at least 1,800 MPa.

A moulded article produced from the polyamide moulding compound preferably has a notch impact strength, determined according to DIN EN ISO 179/2eA, of at least 18 kJ/m$^2$, preferably 21 kJ/m$^2$.

According to a preferred embodiment of the present invention, the polyamide moulding compound according to the invention is free of glass fibres.

In a particularly preferred embodiment, the polyamide moulding compound according to the invention is free of fibrous fillers.

According to a preferred embodiment, component (A) consists of exactly one copolyamide and component (B) of exactly one impact modifier.

According to a preferred embodiment, component (A) consists of exactly one copolyamide, component (B) of exactly one impact modifier and component (C) of exactly one aliphatic, partially crystalline polyamide.

Component (A)

The component (A) consists of at least one amorphous copolyamide formed from the monomers (a1) to (a4):
(a1) 25 to 40% by mol of at least one acyclic, aliphatic diamine with 6 to 10 carbon atoms;
(a2) 10 to 25% by mol of at least one cycloaliphatic diamine with 6 to 36 carbon atoms;
(a3) 20 to 40% by mol of at least one aromatic dicarboxylic acid;
(a4) 10 to 30% by mol of at least one acyclic, aliphatic dicarboxylic acid with 8 to 16 carbon atoms;
the proportions of monomers (a1) and (a2) relating to the sum of the diamines used and adding up to 50% by mol, and the proportions of monomers (a3) and (a4) relating to the sum of the dicarboxylic acids used and adding up to 50% by mol.

According to a preferred embodiment of the present invention, the monomer (a1) concerns a linear or branched diamine with 6 to 8 carbon atoms, particularly preferably 1,6-hexamethylenediamine and/or 2-methyl-1,5-pentanediamine.

The monomer (a2) is preferably a cycloaliphatic diamine with 12 to 20 carbon atoms, which is preferably selected from the group consisting of bis(4-amino-3-methylcyclohexyl)methane (MACM), bis(4-aminocyclohexyl)methane (PACM), 2,2-bis(4-aminocyclohexyl)propane (PACP), 2,2-bis(4-amino-3-methylcyclohexyl)propane (MACP), bis(4-amino-3-ethylcyclohexyl)methane (EACM), 2,2-Bis-(4-amino-3-ethyl-cyclohexyl)propane (EACP), bis(4-amino-3,5-dimethycyclohexyl)methane (TMACM), 2,2-bis(4-amino-3,5-dimethycyclohexyl)propane (TMACP) and mixtures thereof, bis(4-amino-3-methylcyclohexyl)methane (MACM), bis(4-aminocyclohexyl)methane (PACM) and mixtures thereof being particularly preferred.

The monomer (a3) is preferably an aromatic dicarboxylic acid with 6 to 36 carbon atoms, which is preferably selected from the group consisting of terephthalic acid (TPS), naphthalenedicarboxylic acid (NDA), including 1,5-naphthalenedicarboxylic acid and 2,6-naphthalenedicarboxylic acid, isophthalic acid (IPS), biphenyl dicarboxylic acids, particularly preferably diphenyl-2,2'-dicarboxylic acid, 4,4'-diphenyldicarboxylic acid, 3,3'-diphenyldicarboxylic acid, 4,4'-diphenyl ether dicarboxylic acid, 4,4'-diphenylmethanedicarboxylic acid and 4,4'-diphenyl sulphonedicarboxylic acid, 1,5-anthracenedicarboxylic acid, p-terphenylene-4,4''-dicarboxylic acid and 2,5-pyridinedicarboxylic acid and mixtures thereof, terephthalic acid and isophthalic acid and mixtures thereof being highly preferred.

The monomer (a4) is preferably an acyclic, linear or branched aliphatic dicarboxylic acid with 10 to 14 carbon atoms, which is selected preferably from the group consisting of decanedioic acid, undecanedioic acid, dodecanedioic acid, tridecanedioic acid, tetradecanedioic acid and mixtures thereof, there being used particularly preferably dodecanedioic acid and highly preferably exclusively dodecanedioic acid.

As monomer (a3), preferably a mixture of terephthalic acid and isophthalic acid can be used, preferably in a molar ratio of 2:1 to 1:2, in particular in a ratio of 1.5:1 to 1:1.5, there being used highly preferably an equimolar mixture of terephthalic acid and isophthalic acid.

The proportion of monomer (a1) in the copolyamide is preferably in the range of 27.5 to 40% by mol, preferably in the range of 30 to 38.5% by mol and/or the proportion of monomer (a2) in the copolyamide is preferably in the range of 10 to 22.5% by mol and particularly preferably in the range of 11.5 to 20% by mol, the proportions of monomers (a1) and (a2) relating to the sum of the diamines used and adding up to 50% by mol.

The proportion of monomer (a3) in the copolyamide is preferably in the range of 25 to 40% by mol, preferably in the range of 30 to 37.5% by mol and/or the proportion of monomer (a4) in the copolyamide is preferably in the range of 10 to 25% by mol, and particularly preferably in the range of 12.5 to 20% by mol, the proportions of monomers (a3) and (a4) relating to the sum of the dicarboxylic acids used and adding up to 50% by mol.

According to a further preferred embodiment
monomer (a1) is selected as 1,6-hexamethylenediamine;
monomer (a2) is selected from the group consisting of bis(4-amino-3-methylcyclohexyl) methane (MACM), bis(4-amino-cyclohexyl)methane (PACM) and mixtures thereof, preferably as exclusively bis(4-amino-3-methylcyclohexyl) methane MACM;
monomer (a3) is selected from the group consisting of terephthalic acid, isophthalic acid and mixtures thereof, preferably a mixture in a ratio of 1.5:1 to 1:1.5, in particular preferably an equimolar mixture;

monomer (a4) is selected as dodecanedioic acid.

Preferably the proportions of monomers are thereby selected as follows:
- (a1) in the range of 30 to 37.5% by mol;
- (a2) in the range of 12.5 to 20% by mol;
- (a3) in the range of 30 to 37.5% by mol;
- (a4) in the range of 12.5 to 20% by mol;

the proportions of monomers (a1) and (a2) relating to the sum of the diamines used and adding up to 50% by mol, and the proportions of monomers (a3) and (a4) relating to the sum of the dicarboxylic acids used and adding up to 50% by mol.

It is thereby preferred in general that, within the scope of component (A), no elements based on lactam or amino acid are used. Component (A) is therefore essentially free of lactam- and/or amino acid elements (i.e. a proportion of less than 2 percent by weight, preferably less than one percent by weight, relative to the total mass of (A)). Preferably, component (A) is entirely free of lactam- and/or amino acid elements.

A particularly preferred copolyamide (A) is constructed from the following monomers:
- (a1) is 1,6-hexamethylenediamine in the range of 30 to 33% by mol;
- (a2) is MACM in the range of 17 to 20% by mol;
- (a3) an equimolar mixture of terephthalic acid and isophthalic acid in the range of 29.5 to 32.5% by mol;
- (a4) is dodecanedioic acid in the range of 17.5 to 20.5% by mol;

the proportions of monomers (a1) and (a2) relating to the sum of the diamines used and adding up to 50% by mol, and the proportions of monomers (a3) and (a4) relating to the sum of the dicarboxylic acids used and adding up to 50% by mol.

Furthermore, it is preferred if component (A) has a relative viscosity, determined on solutions of 0.5 g polymer in 100 ml m-cresol according to ISO 307 (2013) at 20° C., of 1.50 to 1.90, particularly preferably of 1.60 to 1.80 and very particularly preferably of 1.65 and 1.80, and/or if component (A) has a glass transition temperature of at least 100° C., preferably of at least 120 or 130° C. and particularly preferably of at least 140° C., however thereby preferably of no more than 220° C. or no more than 200° C., the glass temperature being determined by means of DSC according to ISO 11357-2 (2013) with a heating rate of 20 K/min.

The copolyamides according to component (A) are amorphous and have no measurable or only very small melting heats (melt enthalpies) of preferably at most 4 J/g, particularly preferably of at most 2 J/g and very particularly preferably of at most 1 J/g (determined according to ISO 11357-3 (2013) on granulate, differential scanning calorimetry (DSC) with a heating rate of 20 K/min).

Component (B)

According to a preferred embodiment of the present invention, the functionalisation of component (B) is effected by copolymerisation and/or by grafting. For this purpose, a compound selected from the group consisting of unsaturated carboxylic acids, unsaturated carboxylic acid derivatives and mixtures hereof and/or unsaturated glycidyl compounds is used particularly preferably. This is selected particular preferably from the group consisting of unsaturated carboxylic acid esters, in particular acrylic acid esters and/or methacrylic acid esters, unsaturated carboxylic acid anhydrides, in particular maleic anhydride, glycidylacrylic acid, glycidylmethacrylic acid, α-ethylacrylic acid, maleic acid, fumaric acid, itaconic acid, citraconic acid, aconitic acid, tetrahydrophthalic acid, butenylsuccinic acid and mixtures hereof.

If the functionalisation is effected by copolymerisation, the weight proportion of each individual compound used for the functionalisation is preferably in the range of 3 to 20% by weight, particularly preferably of 5 to 16% by weight and particularly preferably of 6 to 14% by weight, respectively relative to the total weight of component (B).

If the functionalisation is effected by grafting, the weight proportion of each individual compound used for the functionalisation is preferably in the range of 0.4 to 2.0% by weight, particularly preferably of 0.6 to 1.6% by weight and particularly preferably of 0.8 to 1.4% by weight, respectively relative to the total weight of component (B).

Impact modifiers functionalised by copolymerisation can in addition also be functionalised by grafting.

The styrene-butadiene-styrene triblock copolymers concern linear triblock copolymers made of a butadiene block and two styrene blocks.

The styrene proportion in the styrene-butadiene-styrene triblock copolymers is preferably of 25 to 53% by weight, particularly preferably of 30 to 48% by weight and very particularly preferably of 35 to 45% by weight.

The styrene-butadiene-styrene triblock copolymers preferably have a melt flow rate (MFR) of 4 to 25 g/10 min, particularly preferably of 5 to 20 g/10 min and very particularly preferably of 6 to 15 g/10 min. The melt flow rate is thereby measured at 200° C. and 5 kg according to ISO 1133.

The styrene proportion in the styrene-butadiene-styrene triblock copolymers is preferably of 25 to 53% by weight, particularly preferably of 30 to 48% by weight and very particularly preferably of 35 to 45% by weight and/or the styrene-butadiene-styrene triblock copolymers are grafted with 0.4 to 2.0% by weight, particularly preferably from 0.6 to 1.6% by weight and particularly preferably from 0.8 to 1.4% by weight, of maleic acid anhydride, and/or the styrene-butadiene-styrene triblock copolymers have preferably a melt flow rate (MFR) of 4 to 25 g/10 min, particularly preferably of 5 to 20 g/10 min and very particularly preferably of 6 to 15 g/10 min.

The styrene-butadiene-styrene triblock copolymers are preferably produced via anionic polymerisation with butyl lithium as initiator. This leads, in the butadiene block, to 36 to 38% of cis-1,4 units, 52 to 53% of trans-1,4 units and 10 to 12% of 1,2 units.

The styrene-butadiene-styrene triblock copolymers can also be used in hydrated, crosslinked or vulcanised form in the polyamide moulding compounds according to the invention.

The at least one styrene-butadiene-styrene triblock copolymers according to component (B) can also be used in the form of a mixture or a blend, i.e. a mixture homogenised in the melt, with one or more non-functionalised styrene-butadiene-styrene triblock copolymers, the weight proportion of the functionalisation being furthermore within the previously mentioned ranges for the functionalisation by copolymerisation or by grafting.

According to a preferred embodiment, the polyamide moulding compounds according to the invention do not however comprise any non-functionalised styrene-butadiene-styrene triblock copolymers.

Component (C)

According to a preferred embodiment, component (C) has a relative viscosity in the range of 1.50 to 2.25, preferably of 1.65 to 2.10 and particularly preferably of 1.75 to 2.00.

The relative viscosity is thereby measured at 20° C. according ISO 307 (2007) on a solution of 0.5 g polymer in 100 ml m-cresol.

According to a further preferred embodiment, component (C) has a melting point of 120 to 225° C., preferably of 180 to 210° C., particularly preferably of 190 to 200° C., the melting point being determined by means of DSC according to ISO 11357-3 (2013) with a heating rate of 20 K/min.

Another preferred embodiment provides that component (C) is the copolyamide PA 6/12, formed from ε-caprolactam and 12-laurinlactam.

PA 6/12 is preferably formed from 96 to 75% by mol of ε-caprolactam and 4 to 25% by mol of laurinlactam, particularly preferably of 94 to 80% by mol of ε-caprolactam and 6 to 20% by mol of laurinlactam, very particularly preferably of 92 to 82% by mol of ε-caprolactam and 8 to 18% by mol of 12-laurinlactam.

A particularly preferred embodiment provides that component (C) is copolyamide 6/12 with a melting point of 200° C., a relative viscosity of 1.80 to 2.00 and consisting of 90% by mol of ε-caprolactam and 10% by mol of 12-laurinlactam, the melting point being determined by means of DSC according to ISO 11357-3 (2013) with a heating rate of 20 K/min and the relative viscosity being determined at 20° C. according to ISO 307 (2017) on a solution of 0.5 g polymer in 100 ml m-cresol.

Component (D)

According to a preferred embodiment of the present invention, the additives (D) are selected from the group consisting of inorganic and organic stabilisers, in particular antioxidants, antiozonants, light-protection means, in particular UV stabilisers, UV absorbers or UV blockers, lubricants, colourants, marking means, pigments, carbon black, graphite, graphene, carbon nanotubes, photochromic agents, antistatic agents, mould-release means, condensation catalysts, chain regulators, defoamers, antiblocking means, chain-lengthening additives, optical brighteners, IR absorbers, NIR absorbers, halogen-containing flame retardants, halogen-free flame retardants, natural layer silicates, synthetic layer silicates, metallic pigments, metal flakes, metal-coated particles, particulate fillers, fibrous fillers, nanoscale fillers with a particle diameter ($d_{95}$) of at most 100 nm, determined by means of laser diffraction according to ISO 13320 (2009) and mixtures thereof.

The layer silicates and fillers can be surface-treated. This can take place with a suitable sizing- or adhesive system. For this purpose, for example systems based on fatty acids, waxes, silanes, titanates, polyamides, urethanes, polyhydroxy ethers, epoxides, nickel respectively combinations or mixtures thereof can be used.

As particulate fillers, all fillers known to the person skilled in the art are possible. There are included herein in particular particulate fillers selected from the group consisting of minerals, talc, mica, dolomite, silicates, quartz, titanium dioxide, wollastonite, kaolin, silicic acids, magnesium carbonate, magnesium hydroxide, chalk, ground glass, glass flakes, ground carbon fibres, ground or precipitated calcium carbonate, lime, feldspar, barium sulphate, zinc sulphide, zinc oxide, permanent-magnetic or magnetisable metals or alloys, glass balls, hollow glass balls, hollow ball silicate fillers and mixtures thereof.

According to a particularly preferred embodiment of the present invention, the additives (D) are selected from the group consisting of inorganic and organic stabilisers, in particular antioxidants, antiozonants, light-protection means, in particular UV stabilisers, UV absorbers or UV blockers, lubricants, colourants, marking means, pigments, photochromic agents, antistatic agents, mould-release means, condensation catalysts, chain regulators, defoamers, antiblocking means, chain-lengthening additives, optical brighteners, IR absorbers, NIR absorbers, natural layer silicates, synthetic layer silicates, particulate fillers, nanoscale fillers with a particle diameter ($d_{95}$) of at most 100 nm, determined by means of laser diffraction according to ISO 13320 (2009) and mixtures thereof.

The additives (D) are contained preferably from 0.1 to 6% by weight, and particularly preferably from 0.2 to 4% by weight, relative to the total weight of the polyamide moulding compound.

Moulded Articles

The moulded articles according to the invention can be produced from the polyamide moulding compound according to the invention via current processing techniques, such as e.g. injection moulding methods.

A preferred embodiment of the present invention provides that the moulded article is selected from the group consisting of decorative elements, in particular in the automobile interior or fashion sphere, sports articles, in particular ski boots, midsoles for sports shoes, leisure articles, toys, in particular construction elements, components, figures or models, household articles, in particular containers, dishes, bowls, tins, beakers, baby bottles or drinking bottles, components of kitchen appliances, components of spectacles, in particular spectacle frames or spectacle sidepieces, in particular for safety goggles, sports goggles or ski goggles, furniture coverings, insoles, construction- and trim parts for appliances in the sanitary, hygiene and cosmetic field, parts for safety shoes, in particular caps, filter cups, inspection glasses, through-flow meters, bursting discs, containers, housings or housing parts for electrical and electronic appliances, in particular for shaving apparatus, depilators, measuring devices, infrared keys, mobile phones, players, personal digital assistants (PDA), smart phones or storage media (e.g. USB sticks) protective covers for mobile phones, trim parts in the computer and telecommunication field, pipes, hoses and components of e-cigarettes.

Uses

Furthermore, the present invention relates to the use of the above-defined polyamide moulding compound according to the invention for the production of decorative elements, in particular in the automobile interior or fashion sphere, sports articles, in particular ski boots, midsoles for sports shoes, leisure articles, toys, in particular construction elements, components, figures or models, household articles, in particular containers, dishes, bowls, tins, beakers, baby bottles or drinking bottles, components of kitchen appliances, components of spectacles, in particular spectacle frames or spectacle sidepieces, in particular for safety goggles, sports goggles or ski goggles, furniture coverings, insoles, construction- and trim parts for appliances in the sanitary, hygiene and cosmetic field, parts for safety shoes, in particular caps, filter cups, inspection glasses, through-flow meters, bursting discs, containers, housings or housing parts for electrical and electronic appliances, in particular for shaving apparatus, depilators, measuring devices, infrared keys, mobile phones, players, personal digital assistants (PDA), smart phones or storage media (e.g. USB sticks) protective covers for mobile phones, trim parts in the computer and telecommunication field, pipes, hoses and components of e-cigarettes.

The subject according to the invention is intended to be explained in more detail with reference to the subsequent examples without wishing to restrict said subject to the specific embodiments shown here.

Measuring Method

Relative Viscosity

The relative viscosity was determined according to ISO 307 (2007) at 20° C. For this purpose, 0.5 g of polymer granulate was weighed into 100 ml m-cresol, calculation of the relative viscosity (RV) according to $RV=t/t_0$ was effected in accordance with section 11 of the standard.

Melting Point and Glass Transition Temperature (Tg)

Determination of the melting point was effected according to ISO 11357-3 (2013) on granulate.

Differential scanning calorimetry (DSC) was implemented during each of the two heatings with a heating rate of 20 K/min. After the first heating, the sample was quenched in dry ice. The melting point was determined during the second heating.

The temperature at peak maximum was indicated as melting point. The average of the glass transition range, which was indicated as glass transition temperature (Tg), was determined according to the "half height" method.

Modulus of Elasticity in Tension

Determination of the modulus of elasticity in tension was implemented according to ISO 527 (2012) at 23° C. with a tensile speed of 1 mm/min on an ISO tensile bar (type A1, mass 170×20/10×4, produced according to the standard: ISO/CD 3167 (2003).

Notch Impact Strength According to Charpy

Determination of the notch impact strength according to Charpy was implemented according to DIN EN ISO 179/2eA (2000) at 23° C. on an ISO test bar, type B1 (mass 80×10×4 mm), produced according to the standard ISO/CD3167 (2003).

Light Transmission and Haze

Light transmission and haze were determined at 23° C. according to ASTM D 1003 (2013) on 60×60 mm plates (width×length) with 2 mm thickness and film gate on "Haze Gard plus" of the company Byk Gardner with CIE light type C. The transmission value was indicated in % of the irradiated light quantity.

MVR (Melt Volume Rate) or MFR (Melt Flow Rate)

Determination of the MVR or MFR was effected according to ISO 1133-1 (2012) on the granulate of the impact modifier at the temperature and loading indicated in table 1.

Production of the Test Bodies

For production of the test bodies, granulate with a water content of less than 0.1% by weight was used.

The test bodies were produced on an injection moulding machine of the company Arburg, model Allrounder 420 C 1000-250. Cylinder temperatures increasing and decreasing from the feed to the nozzle were thereby used.

ISO tensile bars and ISO test bars
Cylinder temperatures: 260/265/270/275/280/275° C.
Mould temperature: 80° C.
Plates 60×60×2 mm
Cylinder temperatures: 270/275/280/285/290/285° C.
Mould temperature: 80° C.
For production of the plates, a polished mould was used.

The test bodies, provided nothing different is indicated, were used in the dry state; for this purpose, they were stored after the injection moulding for at least 48 h at room temperature in a dry environment, i.e. over silica gel.

Starting Materials

| Components | Description | Manufacturer |
|---|---|---|
| Polyamide (A) | Amorphous polyamide made of 1,6-hexanediamine (31.5% by mol), bis(3-methyl-4-aminocyclohexyl)methane (18.5% by mol), isophthalic acid (15.5% by mol), terephthalic acid (15.5% by mol) and 1,12-dodecanedioic acid (19.0% by mol) RV* 1.71 (measured with 0.5 g in 100 ml m-cresol at 20° C.) glass transition temperature 141° C. | EMS-CHEMIE AG, Switzerland |
| Impact modifier (B) | Styrene-butadiene-styrene triblock copolymer with 40% by weight of styrene grafted with 1.0% by weight of maleic anhydride MFR 22 g/10 min at 200° C. and 5 kg. trade name: Tufprene 912 | Asahi Kasei Corporation, Japan |
| Polyamide (C1) | Partially crystalline, linear aliphatic copolyamide 6/12 made of caprolactam (90% by mol) and laurinlactam (10% by mol) RV* 1.87 (measured with 0.5 g in 100 ml m-cresol at 20° C.) melting point 200° C. | EMS-CHEMIE AG, Switzerland |
| Polyamide (C2) | Partially crystalline, linear aliphatic polyamide 612 made of 1,6-hexanediamine and 1,12-dodecanedioic acid RV* 1.80 (measured with 0.5 g in 100 ml m-cresol at 20° C.) melting point 220° C. | EMS-CHEMIE AG, Switzerland |
| Polyamide MACM12 | Amorphous polyamide made of bis(3-methyl-4-aminocyclohexyl)methane and 1,12-dodecanedioic acid RV* 1.53 (measured with 0.5 g in 100 ml m-cresol at 20° C.) glass transition temperature 155° C. | EMS-CHEMIE AG, Switzerland |

The materials which were used in the examples and comparative examples are compiled in tables 1 and 2.

TABLE 1

Materials used in the examples and comparative examples.

| | | |
|---|---|---|
| Polyamide MACMI/MACMT/12 | Amorphous polyamide made of bis(3-methyl-4-aminocyclohexyl)methane (38.0% by mol, isophthalic acid (19.0% by mol), terephthalic acid (19.0% by mol) and laurinlactam (24.0% by mol) C atoms per amide group 9.3 RV* 1.53 (measured with 0.5 g in 100 ml m-cresol at 20° C.) glass transition temperature 194° C. | EMS-CHEMIE AG, Switzerland |
| Polyamide MACMI/MACM36 | Amorphous polyamide made of bis(3-methyl-4-aminocyclohexyl)methane (50.0% by mol), isophthalic acid (40.5% by mol) and dimeric fatty acid with 36 C atoms (9.5% by mol) RV* 1.42 (measured with 0.5 g in 100 ml m-cresol at 20° C.) glass transition temperature 195° C. | EMS-CHEMIE AG, Switzerland |
| Polyamide 6T/6I/MACMT/MACMI/ PACMT/PACMI/12 | Amorphous polyamide made of 1,6-hexanediamine (39.0% by mol), bis(3-methyl-4-aminocyclohexyl)methane (7.1% by mol), bis(4-aminocyclohexyl)methane (2.5% by mol), isophthalic acid (24.3% by mol), terephthalic acid (24.3% by mol) and laurinlactam (2.8% by mol) RV* 1.60 (measured with 0.5 g in 100 ml m-cresol at 20° C.) glass transition temperature 159° C. | EMS-CHEMIE AG, Switzerland |
| Kraton FG1901 GT | Styrene-ethylene/butylene-styrene block copolymer with 30% by weight of styrene, grafted with 1.7% by weight of maleic anhydride MVR 130 cm$^3$/10 min at 275° C. and 5 kg | Kraton Polymers LLC, USA |
| Tafmer MC201 | Blend made of ethylene/propylene copolymer and ethylene/1-butene copolymer in the weight ratio 67:33 0.6% by weight of maleic anhydride MVR* 1.3 cm$^3$/10 min at 230° C. and 2.16 kg | Mitsui Chemicals, Japan |
| Paraloid BTA 753 | Core-shell polymer with butadiene-methylmethacrylate copolymer as core and polystyrene as shell | Rohm and Haas, USA |
| Lotader AX 8840 | Copolymer made of ethylene and glycidylmethacrylate with 8% by weight of glycidylmethacrylate MFR 5 g/10 min at 190° C. und 2.16 kg | Arkema GmbH, Germany |

*relative viscosity, measured on a solution made of 0.5 g polyamide in 100 ml m-cresol at 20° C.

TABLE 2

Materials used in the examples and comparative examples

| Components | Description | Trade name | Manufacturer |
|---|---|---|---|
| Stabiliser 1 | N,N'-hexane-1,6-diylbis[3-(3,5-di-tert-butyl-4-hydroxyphenylpropionamide CAS-no.: 23128-74-7 | Irganox 1098 | BASF SE, Germany |
| Stabiliser 2 | tris(2,4-ditert-butylphenyl)phosphite CAS-no.: 31570-04-4 | Hostanox PAR24 | Clariant Produkte (Schweiz) AG, Switzerland |
| Stabiliser 3 | N,N'-bis(2,2,6,6,tetramethyl-4-piperidinyl)-1,3-benzenedicarboxamide CAS-no.: 42774-15-2 | Nylostab S-EED P | Clariant Produkte (Schweiz) AG, Switzerland |

EXAMPLES AND COMPARATIVE EXAMPLES

General Production Specification for Copolyamides (A)

The production of the transparent copolyamides according to the invention is effected, in a manner known per se, in known, agitatable pressure autoclaves with a receiving vessel and a reaction vessel:

In the receiving vessel, deionised water is placed and the monomers and any additives are added. Thereafter, the atmosphere is made inert multiple times with nitrogen gas. With agitation, heating takes place at 180 to 230° C. under the adjusting pressure in order to obtain a homogeneous solution. This solution is pumped through a sieve into the reaction vessel and heated there to the desired reaction temperature of 270 to 310° C. at a pressure of at most 30 bar. The batch is retained in the pressure phase for 2 to 4 hours at the reaction temperature. In the subsequent pressure-release phase, the pressure is reduced to atmospheric pressure within 1 to 2 hours, the temperature being able to drop slightly. In the following pressure-release phase, the batch is retained at a temperature of 250 to 310° C. at atmospheric pressure for 0.5 to 3 hours. The polymer melt is discharged in strand form, cooled in the water bath at 10 to 80° C. and granulated. The granulate is dried at 60 to 120° C. under nitrogen or in a vacuum to a water content of less than 0.1% by weight.

General Production Specification for the Polyamide Moulding Compounds

For the production of the polyamide moulding compound according to the invention, components (A), (B) and possibly (C) and/or (D) are mixed on normal compounding machines, such as e.g. single- or twin-screw extruders or screw kneaders. The components are thereby metered individually into the feed via gravimetric or volumetric metering scales or respectively into a sidefeeder or supplied in the form of a dry blend.

If additives (component (D)) are used, these can be introduced directly or in the form of a master batch. The carrier material of the master batch preferably concerns a polyamide or a polyolefin. Amongst the polyamides, the polyamide of component (A) is suitable in particular for this purpose.

For the dry blend production, the dried granulates of components (A), (B) and possibly (C) and/or (D) are mixed in a closed container. This mixture is homogenised for 10 to 40 minutes by means of a tumble mixer, drum hoop mixer or tumble drier. In order to avoid absorption of moisture, this can be effected under a dried protective gas.

The compounding is effected at set cylinder temperatures of 250 to 310° C., the temperature of the first cylinder being able to be adjusted below 90° C. Degassing can take place in front of the nozzle. This can be effected by means of vacuum or atmospherically. The melt is discharged in strand form, cooled in the water bath at 10 to 80° C. and subsequently granulated. The granulate is dried at 60 to 120° C. under nitrogen or in a vacuum to a water content of below 0.1% by weight.

Production of the Polyamide Moulding Compound According to Example 1

The dried granulates of components (A) and (B) and the additives (D) were mixed to form a dry blend, and in fact in the ratio indicated in table 3. This mixture was homogenised for approx. 20 minutes by means of a tumble mixer.

The polyamide moulding compound was produced on a twin-screw extruder of the company Werner 86 Pfleiderer type ZSK 25. The dry blend was thereby metered into the feed via metering scales.

The temperature of the first housing was adjusted to 50° C., those of the remaining housings to 270 to 290° C. A speed of rotation of 200 rpm and a throughput of 10 kg/h was used. Degassing did not take place. The melt strand was cooled in a water bath, cut and the obtained granulate was dried at 80° C. for 24 h in a vacuum (30 mbar) to a water content of below 0.1% by weight.

Test Results

All examples and comparative examples comprise 0.3% by weight of additives which are composed respectively of 0.1% by weight of stabilisers 1 to 3.

The moulding compounds according to the invention were tested with respect to the modulus of elasticity in tension, notch impact strength, haze and light transmission under measuring conditions as were indicated previously.

The results of these tests are illustrated in table 3.

TABLE 3

| | | Examples | | | | | | |
|---|---|---|---|---|---|---|---|---|
| Components | Unit | 1 | 2 | 3 | 4 | 5 | 6 | 7 |
| Polyamide (A) | % by weight | 89.7 | 92.2 | 89.7 | 84.7 | 79.7 | 84.7 | 89.7 |
| SBS impact modifier (B) | % by weight | 5.0 | 7.5 | 10.0 | 10.0 | 10.0 | 10.0 | 20.0 |
| Polyamide (C1) | % by weight | — | — | — | 5.0 | 10.0 | — | — |
| Polyamide (C2) | % by weight | — | — | — | — | — | 5.0 | — |
| Additives | % by weight | 0.3 | 0.3 | 0.3 | 0.3 | 0.3 | 0.3 | 0.3 |
| Measured values | | | | | | | | |
| Modulus of elasticity in tension | MPa | 1990 | 1940 | 1840 | 1890 | 1910 | 1855 | 1535 |
| Notch impact strength, Charpy, 23° C. | kJ/m$^2$ | 22 | 23 | 25 | 26 | 26 | 27 | 33 |
| Haze | % | 5.0 | 7.1 | 9.8 | 7.0 | 6.2 | 7.1 | 22.5 |
| Light transmission | % | 92.7 | 91.1 | 92.0 | 91.2 | 91.0 | 91.1 | 90.8 |

Likewise moulding compounds not according to the invention were tested with respect to modulus of elasticity in tension, notch impact strength, haze and light transmission under the same measuring conditions. The results of the comparative examples are compiled in the following table 4.

TABLE 4

| | | Comparative examples | | | | | | | | | |
|---|---|---|---|---|---|---|---|---|---|---|---|
| Components | Unit | 8 | 9 | 10 | 11 | 12 | 13 | 14 | 15 | 16 | 17 |
| Polyamide (A) | % by weight | 89.7 | 89.7 | 92.2 | 92.2 | — | — | — | — | — | 99.97 |
| Polyamide MACM12 | % by weight | — | — | — | — | 89.7 | 89.7 | — | — | — | — |

TABLE 4-continued

Comparative examples

| Components | Unit | 8 | 9 | 10 | 11 | 12 | 13 | 14 | 15 | 16 | 17 |
|---|---|---|---|---|---|---|---|---|---|---|---|
| Polyamide MACMI/MACMT/12 | % by weight | — | — | — | — | — | — | 89.7 | — | — | — |
| Polyamide MACMI/MACM36 | % by weight | — | — | — | — | — | — | — | 89.7 | — | — |
| Polyamide 6I/6T/MACMI/MACMT/PACMI/PACMT/12 | % by weight | — | — | — | — | — | — | — | — | 89.7 | — |
| SBS impact modifier (B) | % by weight | — | — | — | — | 10.0 | — | 10.0 | 10.0 | 10.0 | — |
| Kraton FG1901 GT | % by weight | 10.0 | — | — | — | — | 10.0 | — | — | — | — |
| Tafmer MC201 | % by weight | — | 10.0 | — | — | — | — | — | — | — | — |
| Paraloid BTA 753 | % by weight | — | — | 7.5 | — | — | — | — | — | — | — |
| Lotader AX 8840 | % by weight | — | — | — | 7.5 | — | — | — | — | — | — |
| Additives | % by weight | 0.3 | 0.3 | 0.3 | 0.3 | 0.3 | 0.3 | 0.3 | 0.3 | 0.3 | 0.3 |
| Measured values | | | | | | | | | | | |
| Modulus of elasticity in tension | MPa | 1825 | 2120 | 2025 | 1935 | 1305 | 1285 | 1785 | 1850 | 2510 | 2285 |
| Notch impact strength, Charpy, 23° C. | kJ/m² | 83 | 85 | 28 | 49 | 69 | 75 | 24 | 14 | 35 | 9 |
| Haze | % | 89.7 | 99.4 | 78.8 | 39.3 | 100 | 12.4 | 38.2 | 64.7 | 99.1 | 0.5 |
| Light transmission | % | 46.5 | 13.0 | 77.7 | 45.0 | 60.4 | 90.4 | 90.8 | 88.8 | 20.2 | 93.5 |

Discussion of the Results

The materials of examples 1 to 7, relative to the non-impact-modified polyamide (A) from comparative example 17, display a significantly improved notch impact strength and in fact without great impairment to haze, light transmission or modulus of elasticity in tension.

Other impact modifiers in polyamide (A) impair haze, light transmission or the modulus of elasticity in tension, as can be deduced from the comparative examples 8 to 11.

The impact modifier (B), in other amorphous polyamides, effects significant impairment to haze, light transmission or modulus of elasticity in tension, as the comparative examples 12 to 16 illustrate.

The invention claimed is:

1. A polyamide moulding compound comprising components (A) to (D):
(A) 55 to 97% by weight of at least one amorphous copolyamide formed from the monomers (a1) to (a4):
(a1) 25 to 40% by mol of at least one acyclic, aliphatic diamine with 6 to 10 carbon atoms;
(a2) 10 to 25% by mol of at least one cycloaliphatic diamine with 6 to 36 carbon atoms;
(a3) 20 to 40% by mol of at least one aromatic dicarboxylic acid;
(a4) 10 to 30% by mol of at least one acyclic, aliphatic dicarboxylic acid with 8 to 16 carbon atoms;
the proportions of monomers (a1) and (a2) relating to the sum of the diamines utilized and adding up to 50% by mol, and the proportions of monomers (a3) and (a4) relating to the sum of the dicarboxylic acids utilized and adding up to 50% by mol;
(B) 3 to 22% by weight of at least one functionalised styrene-butadiene-styrene triblock copolymer, wherein the at least one functionalized styrene-butadiene-styrene triblock copolymer is prepared by copolymerizing and/or by grafting a styrene-butadiene-styrene triblock copolymer with a copolymerizing compound and/or a functionalizing compound, wherein said copolymerizing compound or functionalizing compound is selected from the group consisting of unsaturated carboxylic acids, unsaturated carboxylic acid derivatives, unsaturated glycidyl compounds, unsaturated carboxylic acid anhydrides, and mixtures thereof;
(C) 0 to 15% by weight of at least one aliphatic, partially crystalline polyamide, selected from the group consisting of PA 6/12 and PA 612; and
(D) 0 to 8% by weight of at least one additive selected from the group consisting of inorganic stabilisers, organic stabilisers, antioxidants, antiozonants, light blockers, lubricants, colourants, marking agents, carbon black, graphite, graphene, carbon nanotubes, photochromic agents, antistatic agents, mould-release agents, condensation catalysts, chain regulators, defoamers, antiblocking agents, chain-lengthening additives, optical brighteners, IR absorbers, NIR absorbers, halogen-containing flame retardants, halogen-free flame retardants, natural layer silicates, synthetic layer silicates, metal flakes, metal-coated particles, particulate fillers, fibrous fillers, nanoscale fillers with a particle diameter ($d_{95}$) of at most 100 nm, determined by laser diffraction according to ISO 13320 (2009), and mixtures thereof;

the quantity proportions of components (A) to (D) adding up to 100% by weight, wherein a haze of the polyamide moulding compound, measured according to ASTM D1003 on a 2 mm thick plate with width and length: 60×60 mm made from the polyamide moulding compound, is at most 20%, and a transparency of the polyamide moulding compound, measured according to ASTM D1003 on a 2 mm thick plate with width and length: 60×60 mm made from the polyamide moulding compound, is at least 80%.

2. The polyamide moulding compound according to claim 1, wherein
the proportion of component (A) in the polyamide moulding compound is in the range of 61 to 97% by weight, relative to the total weight of the polyamide moulding compound, and/or
the proportion of component (B) in the polyamide moulding compound is in the range of 3 to 20% by weight, relative to the total weight of the polyamide moulding compound, and/or
the proportion of component (C) in the moulding compound is in the range of 0 to 13% by weight, relative to the total weight of the polyamide moulding compound, and/or
the proportion of component (D) in the moulding compound is in the range of 0 to 6% by weight, relative to the total weight of the polyamide moulding compound.

3. The polyamide moulding compound according to claim 1, wherein
a moulded article produced from the polyamide moulding compound has a modulus of elasticity in tension, determined according to ISO 527, of at least 1,500 MPa; and/or
a moulded article produced from the polyamide moulding compound has a notch impact strength, determined according to DIN EN ISO 179/2eA, of at least 18 kJ/m$^2$.

4. The polyamide moulding compound according to claim 1, wherein
monomer (a1) is a linear or branched diamine with 6 to 8 carbon atoms, and/or
monomer (a2) is a cycloaliphatic diamine with 12 to 20 carbon atoms, which is selected from the group consisting of bis(4-amino-3-methylcyclohexyl)methane (MACM), bis(4-aminocyclohexyl)methane (PACM), 2,2-bis(4-aminocyclohexyl)propane (PACP), 2,2-bis(4-amino-3-methylcyclohexyl)propane (MACP), bis(4-amino-3-ethylcyclohexyl)methane (EACM), 2,2-bis(4-amino-3-ethyl-cyclohexyl)propane (EACP), bis(4-amino-3,5-bimethycyclohexyl)methane (TMACM), 2,2-bis(4-amino-3,5-dimethycyclohexyl)propane (TMACP) and mixtures thereof, and/or
monomer (a3) is an aromatic dicarboxylic acid with 6 to 36 carbon atoms, which is selected from the group consisting of terephthalic acid (TPS), naphthalenedicarboxylic acid (NDA), isophthalic acid (IPS), biphenyl dicarboxylic acids, diphenyl-2,2'-dicarboxylic acid, 4,4'-diphenyldicarboxylic acid, 3,3'-diphenyldicarboxylic acid, 4,4'-diphenyl ether dicarboxylic acid, 4,4'-diphenylmethanedicarboxylic acid, 4,4'-diphenyl sulphone dicarboxylic acid, 1,5-anthracenedicarboxylic acid, p-terphenylene-4,4''-dicarboxylic acid and 2,5-pyridinedicarboxylic acid and mixtures thereof, and/or
monomer (a4) is an acyclic, linear or branched aliphatic dicarboxylic acid with 10 to 14 carbon atoms, which is selected from the group consisting of decanedioic acid, undecanedioic acid, dodecanedioic acid, tridecanedioic acid, tetradecanedioic acid and mixtures thereof.

5. The polyamide moulding compound according to claim 1, wherein monomer (a3) is a mixture of terephthalic acid and isophthalic acid, in a molar ratio of 2:1 to 1:2.

6. The polyamide moulding compound according to claim 1, wherein
the proportion of monomer (a1) in the copolyamide is in the range of 27.5 to 40% by mol; and/or
the proportion of monomer (a2) in the copolyamide is in the range of 10 to 22.5% by mol, and/or
the proportion of monomer (a3) in the copolyamide is in the range of 25 to 40% by mol; and/or
the proportion of monomer (a4) in the copolyamide is in the range of 10 to 25% by mol %.

7. The polyamide moulding compound according to claim 1, wherein
monomer (a1) is 1,6-hexamethylenediamine;
monomer (a2) is selected from the group consisting of bis(4-amino-3-methylcyclohexyl)methane (MACM), bis(4-amino-cyclohexyl)methane (PACM) and mixtures thereof;
monomer (a3) is selected from the group consisting of terephthalic acid, isophthalic acid, and mixtures thereof; and
monomer (a4) is dodecanedioic acid.

8. The polyamide moulding compound according to claim 1, wherein component (B) is a linear triblock copolymer made of a butadiene block and two styrene blocks, the styrene proportion in the styrene-butadiene-styrene triblock copolymer being 25 to 53% by weight.

9. The polyamide moulding compound according to claim 1,
wherein the at least one functionalized styrene-butadiene-styrene triblock copolymer of component (B) is prepared by copolymerizing and/or by grafting of a styrene-butadiene-styrene triblock copolymer with a copolymerizing compound and/or a grafting compound selected from the group consisting of acrylic acid esters, methacrylic acid esters, maleic anhydride, glycidylacrylic acid, glycidylmethacrylic acid, α-ethylacrylic acid, maleic acid, fumaric acid, itaconic acid, citraconic acid, aconitic acid, tetrahydrophthalic acid, butenylsuccinic acid, and mixtures thereof.

10. The polyamide moulding compound according to claim 1, wherein:
during of the preparation of the at least one functionalized styrene-butadiene-styrene triblock copolymer of component (B),
the weight proportion of each copolymerizing compound utilized for the copolymerisation is in the range of 3 to 20% by weight, relative to the total weight of component (B), and/or
the weight proportion of each grafting compound utilized for the grafting is in the range of 0.4 to 2.0% by weight, relative to the total weight of component (B).

11. The polyamide moulding compound according to claim 1, wherein component (C) is the copolyamide PA 6/12, formed from 94 to 80% by mol of ε-caprolactam and 4 to 25% by mol of laurinlactam.

12. The polyamide moulding compound according to claim 11, wherein component (C) is the copolyamide PA 6/12, formed from 96 to 75% by mol of ε-caprolactam and 6 to 20% by mol of laurinlactam.

13. The polyamide moulding compound according to claim 1, wherein the fibrous fillers are selected from the group consisting of glass fibres, carbon fibres, metal fibres, aramide fibres, plant fibres, cellulose fibres, nanocellulose fibres, polymer fibres, whiskers, mineral fibres, and mixtures thereof.

14. A moulded article comprising the polyamide moulding compound according to claim 1.

15. The moulded article according to claim 14, which is selected from the group consisting of decorative elements, sports articles, leisure articles, toys, construction elements, toy components, figures, models, household articles, components of kitchen appliances, components of spectacles, furniture coverings, insoles, construction- and trim parts for appliances in the sanitary, hygiene and cosmetic field, parts for safety shoes, filter cups, inspection glasses, through-flow meters, bursting discs, containers, housings or housing parts for electrical and electronic appliances, depilators, measuring devices, infrared keys, mobile phones, players, personal digital assistants (PDA), smart phones or storage media, protective covers for mobile phones, trim parts in computer and telecommunication fields, pipes, hoses, films, and components of e-cigarettes.

* * * * *